United States Patent [19]

Snel

[11] 4,274,988

[45] Jun. 23, 1981

[54] METHOD OF PREPARING DRY MIXTURES IN POWDER FORM FROM POLYVINYLCHLORIDE, LUBRICATING AGENTS AND STABILIZERS, AND THE MANUFACTURE OF OBJECTS THEREFROM

[75] Inventor: Martinus A. Snel, Haarlem, Netherlands

[73] Assignee: Nautamix B. V., Overveen, Netherlands

[21] Appl. No.: 131,481

[22] Filed: Mar. 18, 1980

Related U.S. Application Data

[63] Continuation of Ser. No. 969,231, Dec. 13, 1978, abandoned.

[30] Foreign Application Priority Data

Dec. 18, 1977 [NL] Netherlands ........................ 7714021

[51] Int. Cl.³ .......................... C08K 5/09; C08K 5/10; C08L 27/06
[52] U.S. Cl. ............................ 260/23 XA; 260/31.2 R
[58] Field of Search ...................... 260/23 XA, 31.2 R

[56] References Cited

U.S. PATENT DOCUMENTS

| 3,363,028 | 1/1968 | Szalay | 260/23 XA |
| 4,042,549 | 8/1977 | Ahr et al. | 260/23 XA |
| 4,065,418 | 12/1977 | Foulks et al. | 260/23 XA |
| 4,072,790 | 2/1978 | Creekmore et al. | 260/31.2 R |
| 4,119,601 | 10/1978 | Bonnaud et al. | 260/23 XA |

FOREIGN PATENT DOCUMENTS

| 2225460 | 11/1974 | France . |
| 7314107 | 10/1973 | Netherlands . |
| 7512810 | 10/1975 | Netherlands . |

OTHER PUBLICATIONS

J. Voigt, "Die Stabilisierung Der Kunststoffegegen Licht und Warme," pp. 397–398, Springer Verlag, Berlin, 1966.

*Primary Examiner*—Ronald W. Griffin
*Attorney, Agent, or Firm*—Wilkinson, Mawhinney & Theibault

[57] ABSTRACT

Method for the preparation of polyvinylchloride based dry mixtures in powderform by mixing polyvinylchloride in powder form with one or more lubricating agents and one or more stabilizers, in which the said lubricating agents applied in the said method being iso-stearic acid or one or more liquid esters or as lubricating agents usable heavy-metal salts thereof whereas the said mixing being carried out cold.

3 Claims, No Drawings

METHOD OF PREPARING DRY MIXTURES IN POWDER FORM FROM POLYVINYLCHLORIDE, LUBRICATING AGENTS AND STABILIZERS, AND THE MANUFACTURE OF OBJECTS THEREFROM

This is a continuation of application Ser. No. 969,231, filed Dec. 13, 1978, now abandoned.

The present invention relates to the preparation of polyvinylchloride based dry mixtures in powder form by mixing polyvinylchloride in powder form with one or more lubricating and one or more stabilizers.

Methods of preparing dry polyvinylchloride mixtures have been described in numerous publications. In these known methods, and in order to obtain lump-free and a good flowing dry mixtures for the manufacture of blister-free bottles and foils, it ws always necessary however to heat the mixtures to 100°–130° C. and thereafter to cool them to 35°–45° C. These known dry mixtures included glycerolesters of higher fatty acids such as stearic acid and oleic acid as internal lubricants, as well as polyalkene waxes as external lubricants. These lubricants, however, were exclusively taken up by the polyvinylchloride powder at high temperatures to obtain a dry, homogenuous, non-adhering and free-running product. (See W. S. Penn. P.V.C. technology, Applied Science Publishers Ltd., London, third edition pages 265-300 especially page 273—"Dry blending", and page 276—"Mixing of rigid compounds", and further pages 315-335—"Blow moulding P.V.C." and pages 371-384—"Compounding and properties of rigid P.V.C.").

Netherlands Patent Specification No: 133,881 teaches the use of granulating aids as working lubricating agents for polyvinylchloride at normal temperatures, i.e. from solid and above 40° C. melting, and organic compounds with a long hydrocarbon radical, for example, esters of high fatty acids. For these solid lubricating agents to be taken up in polyvinylchloride powder however, heating to above 40° C. is necessary.

It has now been found that for the preparation of such dry mixtures, the hitherto necessary heating of the mixtures can be omitted by the application of special liquid lubricating agents.

According to the present invention therefor, there is provided:

A method for the preparation of polyvinylchloride based dry mixtures in powder form by mixing polyvinylchloride in powder form with one or more lubricating agents and one or more stabilizers, characterised in this, that the said lubricating agents applied in the said method are iso-stearic acid or one or more as lubricating agents usable heavy-metal salts thereof.

In the method according to the present invention, completely non-adherent and good running dry mixtures can be obtained by cold mixing polyvinylchloride in powder form with the said applied liquid lubricating agents and, for example, organic tin-mercaptides as stabilizers. Iso-stearic acid and its esters are pre-eminently suitable for this purpose and through which, by the use of known ester-tin-mercaptides as stabilizers for polyvinylchloride, the favorable action thereof is still considerably enhanced with respect to the slight volatility thereof at higher temperatures. In addition to this, there is an attendant synergistic working in relation to the thermic-stability and its non-adhesion (non-sticking) to metal parts. Furthermore, the synergistic working can be still further increased by adding small amounts of $H_3PO_3$ and dimethylsulfoxide during the esterification of the mixture, the dimethylsulfoxide acting as a $H_3PO_3$ stabilizer.

Heavy-metal salts of iso-stearic acid have a strong penetrative ability and provide non-adhering and good running dry mixtures by cold mixing. However, they must not be mixed with dialkylthiotin- or with ester-tin stabilising agents but exclusively with other heavy-metal salts to inhibit decomposition.

Preferably, only a small quantity of the total quantity of the polyvinylchloride (for example 10%) should be mixed with the total quantity of the liquid lubricating agents and the stabilizers, and this by means of a fast mixer with the stirrer thereof rotating at a very high speed, whereafter the rest of the polyvinylchloride (for example 90%) is added and thoroughly mixed with the premix which has already been mixed by the fast mixer. The revolutions per minute of the latter should preferably be 1400 minimum and 3000 maximum.

In the mixing of the mixtures according to the present invention, no separation thereof occurs through subjecting them to mixing periods of long duration as is the case with the mixing of known mixtures with the usual mixers therefor.

Netherlands Patent Application No: 75.00991 discloses heavy-metal salts of fatty acids with a branched hydrocarbonchain with 20–28 carbon atoms as stabilising agents for polyvinylchloride. These are thus compounds other than the heavy-metal salts according to the present invention. Furthermore, the latter quoted application 75.00991 makes no mention of the taking up of the concerned heavy-metal salts in the polyvinylchloride in powder form in the preparation of dry mixtures in powder form.

There now follows an example of the method of preparation according to the present invention:

EXAMPLE I

A fatty acid ester is prepared on the basis of:

| | | |
|---|---|---|
| Iso-stearic acid | 4.224 g | (14.9 mol) |
| Montanic acid | 239.3 g | (0.56 mol) |
| $H_3PO_3$ | 41.2 g | (0.5 mol) |
| Water | 18 g | (1 mol) |
| Dimethyl-sulfoxide | 39 g | (0.5 mol) |
| Penta-erythritol | 351.5 g | (2.58 mol) |
| 1,4-butane diol | 72.4 g | (0.8 mol) |
| Xylene | 300 g | (2.8 mol) |

The mixture is heated under reflux up to 120° C. during 25 minutes and in which time it is subjected to a stirring action. Thereafter the water/xylene is distilled off, and during which process 15.8 g (0.28 mol) of calcium oxide is slowly added in parts over a period of 25 minutes. The water is separated from the xylene which is then returned to the boiling mass. When no more water is formed, the xylene is distilled in an atmosphere of $CO_2$ and the temperature is reduced down to 120° C. and at which temperature the flow of $CO_2$ thereto is stopped. Following this, the mixture is supplemented with the following additives:

| | | |
|---|---|---|
| Epoxy-soya oil | 464 g | (1.56 mol) |
| Tin-mercaptide ester | 8.812 g | and |
| Di-octyl-tin maleate | 2.203 g | |

Thereafter cooling takes place to 30° C.

This produces a yield of 16.203 g of stabiliser/lubricating agent mixture approximately.

In a combined mixer provided with a dosing apparatus and a spray-head, such as prescribed for this process, 100 kg of polyvinylchloride and 2.200 g of the stabilizer/lubricating mixture are cold stirred together and within 3 minutes a completely homogenuous dry mixture is obtained and which is completely dry and nonadherent.

Bottles blow moulded from this mixture are completely transparant, have a high gloss and are odourfree. The production rate for these products is 20% faster than with the usual hot-mixed dry mixtures.

EXAMPLE II 3.7 parts (by weight) of a fluid mixture consisting of:

| | |
|---|---|
| Tri-basic lead sulfate | 1.5 parts (by weight) |
| Di-basic lead iso-stearate | 1.5 parts (by weight) |
| Calcium iso-stearate | 0.5 parts (by weight) |
| Iso-stearic acid | 0.2 parts (by weight) |
| | 3.7 parts (by weight) | is cold mixed with 100 parts (by weight) of polyvinylchloride, in powder form and having a K value of 67/68, until a dry powder is obtained.

This powder is suitable for the manufacture of pipes.

EXAMPLE III 5.8 parts (by weight) of a fluid mixture consisting of:

| | |
|---|---|
| Tri-basic lead sulfate | 3.5 parts (by weight) |
| Di-basic lead iso-stearate | 0.5 parts (by weight) |
| Calcium iso-stearate | 0.9 parts (by weight) |
| Unsaturated fatty alcohols $C_{18}$—$C_{20}$ | 0.4 parts (by weight) |
| Penta-erythritol iso-tetra stearate | 0.5 parts (by weight) |
| | 5.8 parts (by weight) | is cold mixed with 100 parts (by weight) of polyvinylchloride, in powder form and having a K value of 67/68, until a dry powder is obtained.

The powder obtained is suitable for the manufacture of strongly thermically-resistant sections.

EXAMPLE IV 5.8 parts (by weight) of a fluid mixture consisting of:

| | |
|---|---|
| Di-basic lead | 3 parts (by weight) |
| Di-basic lead iso-stearate | 1.5 parts (by weight) |
| Calcium iso-stearate | 0.5 parts (by weight) |
| Unsaturated fatty alcohols $C_{18}$—$C_{20}$ | 0.4 parts (by weight) |
| Penta-erythritol iso-tetra stearate | 0.4 parts (by weight) |
| | 5.8 parts (by weight) | is cold mixed with 8.0 parts Omya BSH (chalk), 2.0 parts titaniumdioxide and 100 parts (by weight) of polyvinylchloride, in powder form and having a K value of 67/68, until a dry mixed powder is obtained.

This powder is suitable for the manufacture of blinds.

I claim:

1. A process for preparing a dry powdered polyvinylchloride mixture which comprises, blending powdered polyvinylchloride with at least one lubricant and at least one stabilizer, said lubricant being liquid at room temperature and selected from the group consisting of isostearic acid, liquid esters and metal salts thereof, said blending being effected in the absence of added heat other than the normal heat physically inherent in the mechanical act of blending to promote and obtain penetration of the stabilizer, and lubricants in the polyvinylchloride, said blending being effected at ambient temperature to obtain said dry blend.

2. The process of claim 1 in which initially only a small proportion of the total quantity of polyvinylchloride to be added to the total quantity of lubricating agent and stabilizer is added thereto, and the resulting mixture is homogenized by fast mixing and whereafter the remaining larger proporation of polyvinylchloride is added and homogenuously mixed with the initial mixture.

3. The process of claim 1 wherein said blending is effected at a mixing rate between 1,400 to 3,000 revolutions per minute.

* * * * *